(12) United States Patent
Arifuku (10) Patent No.: US 11,064,117 B2
(45) Date of Patent: Jul. 13, 2021

(54) IMAGING APPARATUS AND RECORDING CONTROL METHOD

(71) Applicant: CANON KABUSHIKI KAISHA, Tokyo (JP)

(72) Inventor: Hironobu Arifuku, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 16/828,838

(22) Filed: Mar. 24, 2020

(65) Prior Publication Data

US 2020/0314336 A1    Oct. 1, 2020

(30) Foreign Application Priority Data

Mar. 29, 2019   (JP) .............................. JP2019-068850

(51) Int. Cl.
*H04N 5/77* (2006.01)
*H04N 5/232* (2006.01)
*H04N 9/80* (2006.01)

(52) U.S. Cl.
CPC ......... *H04N 5/23245* (2013.01); *H04N 5/772* (2013.01)

(58) Field of Classification Search
USPC ................................. 386/248, 239, 242, 225
See application file for complete search history.

(56) References Cited

U.S. PATENT DOCUMENTS

| | | | | |
|---|---|---|---|---|
| 6,424,795 | B1* | 7/2002 | Takahashi | G11B 27/034 386/225 |
| 2009/0128646 | A1* | 5/2009 | Itoh | H04N 9/8047 348/220.1 |
| 2011/0279691 | A1* | 11/2011 | Ishii | H04N 1/2112 348/207.99 |
| 2012/0200718 | A1* | 8/2012 | Tokunaga | H04N 21/44227 348/207.1 |
| 2015/0130960 | A1* | 5/2015 | Minamino | H04N 5/23225 348/220.1 |
| 2016/0219212 | A1* | 7/2016 | Shoji | H04N 5/23212 |

FOREIGN PATENT DOCUMENTS

JP         2008-11235 A        1/2008

* cited by examiner

*Primary Examiner* — Daquan Zhao
(74) *Attorney, Agent, or Firm* — Canon U.S.A., Inc. IP Division

(57) ABSTRACT

An imaging apparatus includes an image capturing unit that continuously captures an optical image to generate continuous images, a metadata generating unit that generates multiple pieces of metadata corresponding to the respective continuous images, a shooting mode setting unit, and a control unit that controls the continuous images and the multiple pieces of metadata so as to be recorded as one image file. The control unit switches recording positions of the multiple pieces of metadata generated by the metadata generating unit in the image file in accordance with a shooting mode set by the shooting mode setting unit.

15 Claims, 4 Drawing Sheets

FIG. 3

IMAGING APPARATUS AND RECORDING CONTROL METHOD

BACKGROUND

Field

The present disclosure relates an imaging apparatus that records multiple pieces of metadata corresponding to multiple continuous images and a recording control method.

Description of the Related Art

Methods are known in which, when continuous images are captured in, for example, continuous shooting or video shooting and the captured continuous images are stored as a moving image file, metadata corresponding to each frame of a moving image is recorded in a frame header of the frame. Use of image parameters or the likes included in the metadata enables image processing to be subsequently performed for the continuous images or enables information to be displayed in playback using the metadata about the frame.

In the image processing using such image parameters, the moving image file is opened, jumping to a frame to be subjected to the image processing is performed to read out frame data, and the metadata corresponding to the frame is read out from the frame header for the image processing.

Pieces of data of different kinds are recorded in the metadata depending on the kind of the image processing to be performed after the creation of the moving image file. Whether the recorded metadata is usable for desired processing is determined only after the metadata is actually read out.

In Japanese Patent Laid-Open No. 2008-11235, the metadata is managed in a file different from the moving image file to enable the metadata to be rapidly used regardless of the kind of content. However, since the metadata and the moving images are managed in different files, it is difficult to manage the files.

In contrast, although the metadata is capable of being used without the management of the files if the metadata is included in the moving image file, it takes time to seek each frame when the metadata about the frame is recorded in the frame header.

SUMMARY

The present disclosure provides an imaging apparatus and a recording control method, which are capable of performing recording of metadata appropriate for applications or the likes of a moving image and the metadata by switching the method of recording the metadata corresponding to each frame of continuous images in accordance with a shooting mode and a recording mode.

According to an aspect of the present disclosure, there is provided an imaging apparatus including an image capturing unit that continuously captures an optical image to generate continuous images, a metadata generating unit that generates multiple pieces of metadata corresponding to the respective continuous images, a shooting mode setting unit, and a control unit that controls the continuous images and the multiple pieces of metadata so as to be recorded as one image file. The control unit switches recording positions of the multiple pieces of metadata generated by the metadata generating unit in the image file in accordance with a shooting mode set by the shooting mode setting unit.

Further features of the present disclosure will become apparent from the following description of exemplary embodiments with reference to the attached drawings.

DESCRIPTION OF THE EMBODIMENTS

Figure 1:
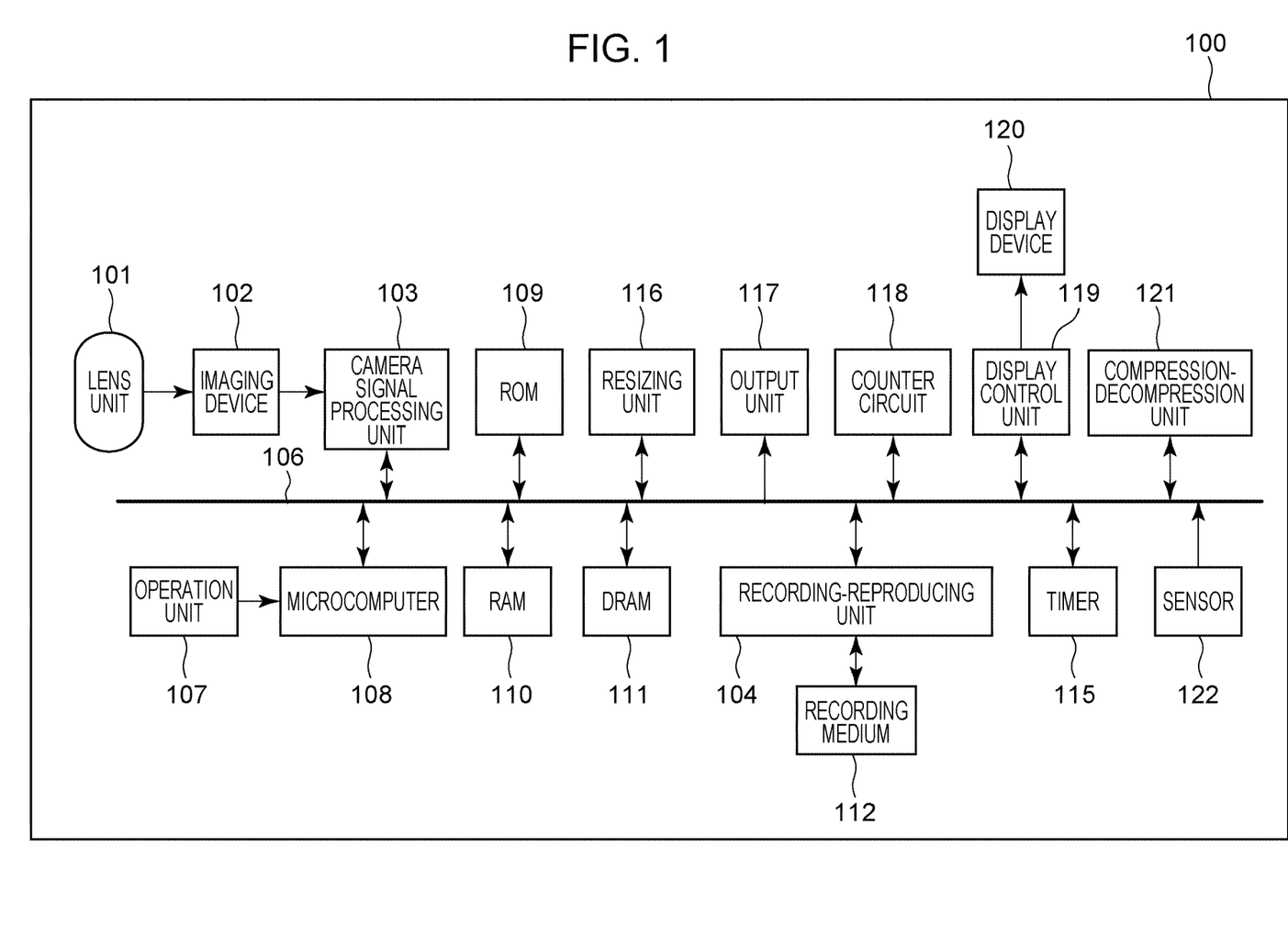
FIG. 1 is a block diagram illustrating an example of the schematic configuration of an imaging apparatus.

Embodiments of the present disclosure will herein be described in detail with reference to the drawings. FIG. 1 is a block diagram according to an embodiment.

FIG. 1 is a block diagram illustrating an example of the schematic configuration of an imaging apparatus 100 according to the embodiment.

The imaging apparatus 100 illustrated in FIG. 1 includes a lens unit 101. An optical image of a subject from the lens unit 101 is incident on an imaging plane of an imaging device 102. The lens unit 101 includes a fixed lens group for light condensing, a variable magnification lens group, an aperture, and a correcting lens group. The correcting lens group performs a function to correct an image forming position that is moved in response to a movement of the variable magnification lens group and a focusing function.

The imaging device 102 is, for example, a complementary metal oxide semiconductor (CMOS) image sensor and converts the intensity of incident light into the amount of charge to generate an image signal. The imaging device 102 outputs the image signal of a predetermined number of pixels at arbitrary timing. In the present embodiment, video recording, still image continuous shooting, and single still image capturing are capable of being performed. In the video recording and the still image continuous shooting, the imaging device 102 continuously outputs the image signal, for example, at a rate of 30 frames per second. A camera signal processing unit 103 performs certain image processing to the image signal output from the imaging device 102 and outputs image data. A resizing unit 116 converts the image signal of a predetermined number of pixels into the image signal of an arbitrary number of pixels. For example, the resizing unit 116 converts the image signal of a predetermined number of pixels into the image signal having a video size of horizontal 1,920 pixels and vertical 1,080 pixels.

A compression-decompression unit 121 compresses and decompresses the image signal using a coding format, such as High Efficiency Video Coding (HEVC) or Joint Photographic Experts Group (JPEG). A recording-reproducing unit 104 records the image data compressed by the compression-decompression unit 121 on a recording medium 112 and reproduces compressed image data recorded on the recording medium 112. The recording-reproducing unit 104 manages an image file recorded on the recording medium 112 in accordance with a certain file system.

A Multi Picture Format (MPF), an MP4 format, or another container may be used as the container format of the image file.

An operation unit 107 is operated by a user for input. The content of the operation by the user is input into a microcomputer 108. The operation unit 107 includes, for example, a video shooting button for instructing start of video recording and end of video recording, a shutter button for instructing capturing of a still image, a menu button for instructing change of a setting, and a status button for instructing display of the status. The continuous shooting of a still image may be instructed by pressing and holding the shutter button.

The microcomputer 108 is composed of one or more processors and is a control unit for controlling the entire imaging apparatus 100. The microcomputer 108 reads out a program from a read only memory (ROM) 109 and performs control of each component and arithmetic processing based on the program that is read out to control the entire imaging apparatus 100 for a shooting process, a recording process, a playback process, and so on. Programs executed by the microcomputer 108 and various settings are stored in the ROM 109. A random access memory (RAM) 110 is composed of a volatile memory used by the microcomputer 108 as a working area. A dynamic random access memory (DRAM) 111 is used to temporarily store the image data, which is the target of processing and the result of processing by the camera signal processing unit 103, the resizing unit 116, the compression-decompression unit 121, and the recording-reproducing unit 104.

Specifically, the camera signal processing unit 103 stores the image data subjected to development in the DRAM 111, and the resizing unit 116 resizes the image data subjected to the development in the DRAM 111 and stores the resized image data in the DRAM 111. The compression-decompression unit 121 reads out a series of image data stored in the DRAM 111 for compression and writes back the compressed image data to the DRAM 111. The recording-reproducing unit 104 sequentially reads out the compressed image data in the DRAM 111 and records the image data that is read out on the recording medium 112. At this time, if the writing-back of the compressed image data to the DRAM 111 is performed before the compressed image data is recorded from the DRAM 111 on the recording medium 112, the area in the DRAM 111 is exhausted to cause the recording operation not to be continued (full of buffer). A threshold value is set and, if the remaining amount of the DRAM 111 becomes smaller than the threshold value before the area in the DRAM 111 is exhausted, the recording operation is stopped because the buffer is full.

An output unit 117 externally outputs a video signal in a certain digital format. For example, the output unit 117 outputs a High-Definition Multimedia Interface (HDMI) (registered trademark) signal or a Serial Digital Interface (SDI) signal.

A counter circuit 118 is a system counter for the imaging apparatus 100. The imaging apparatus 100 operates in accordance with a count value output from the counter circuit 118. For example, the camera signal processing unit 103 is in synchronization with the counter circuit 118, for example, so that the count value is incremented by one each time the camera signal processing unit 103 outputs the image data of one frame.

A display control unit 119 controls image display in a display device 120. Specifically, the display control unit 119 displays various setting menus and information about the title and the time in the display device 120 so as to be superimposed on the image data in response to an instruction from the microcomputer 108. The display device 120 has, for example, a liquid crystal panel and displays an image under the control of the display control unit 119.

A timer 115 is composed of a real-time clock that manages the system time of the imaging apparatus 100. The timer 115 measures the times involved in the imaging apparatus 100, which include an elapsed time since a start-of-shooting instruction is issued with the operation unit 107.

A sensor 122 is, for example, a level or a thermometer and detects the state of the camera.

A bus 106 is used for transmission of data and a control signal between the respective components described above in the imaging apparatus 100.

In the recording process in the imaging apparatus 100, the user is capable of setting a compression mode including the compressibility of the compression-decompression unit 121 before the recording is started. In a video recording setting, the compression-decompression unit 121 compresses a moving image and the recording-reproducing unit 104 records a moving image file of the compressed image data on the recording medium 112.

When the imaging apparatus 100 is in a recording standby state, the imaging device 102 converts an optical image generated by the lens unit 101 into an image signal and the camera signal processing unit 103 converts the image signal output from the imaging device 102 into image data of a certain format and writes the image data to the DRAM 111. The display control unit 119 reads out the image data in the DRAM 111 and causes the display device 120 to display an image corresponding to the image data.

The microcomputer 108 starts the compression operation by the compression-decompression unit 121 and the recording operation by the recording-reproducing unit 104, which correspond to a shooting mode (recording mode) and recording settings, upon reception of a still-image capturing instruction or a start-of-video-recording instruction from the operation unit 107 in the recording standby state. In the case of the start-of-video-recording instruction (a start-of-video-shooting instruction), the microcomputer 108 stops the compression operation by the compression-decompression unit 121 and the recording operation by the recording-reproducing unit 104 upon reception of an end-of-video-recording instruction (an end-of-video-shooting instruction) with a video recording button of the operation unit 107.

First Embodiment

Figure 2:
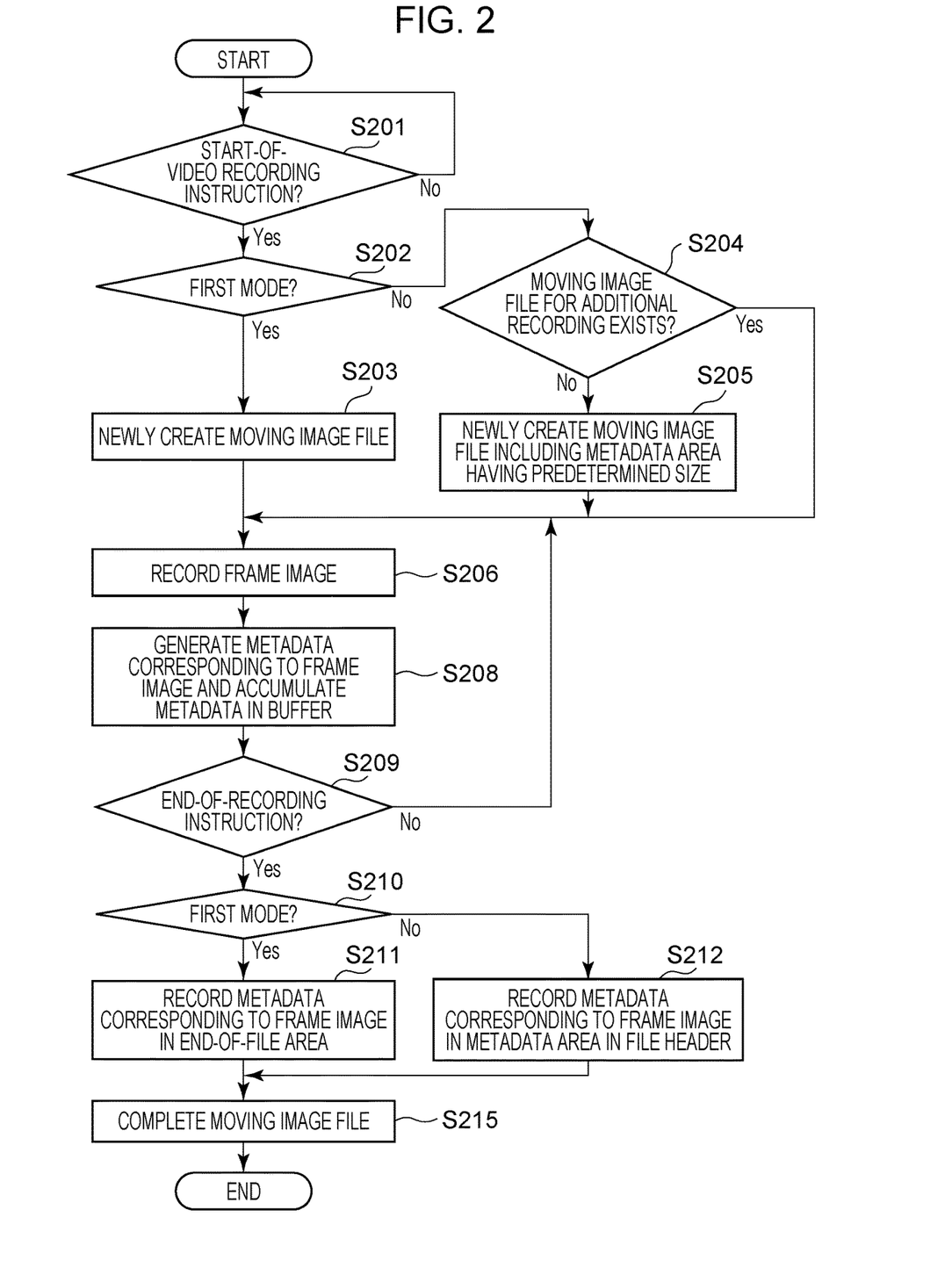
FIG. 2 is a flowchart illustrating a recording operation in the imaging apparatus.
Figure 3:
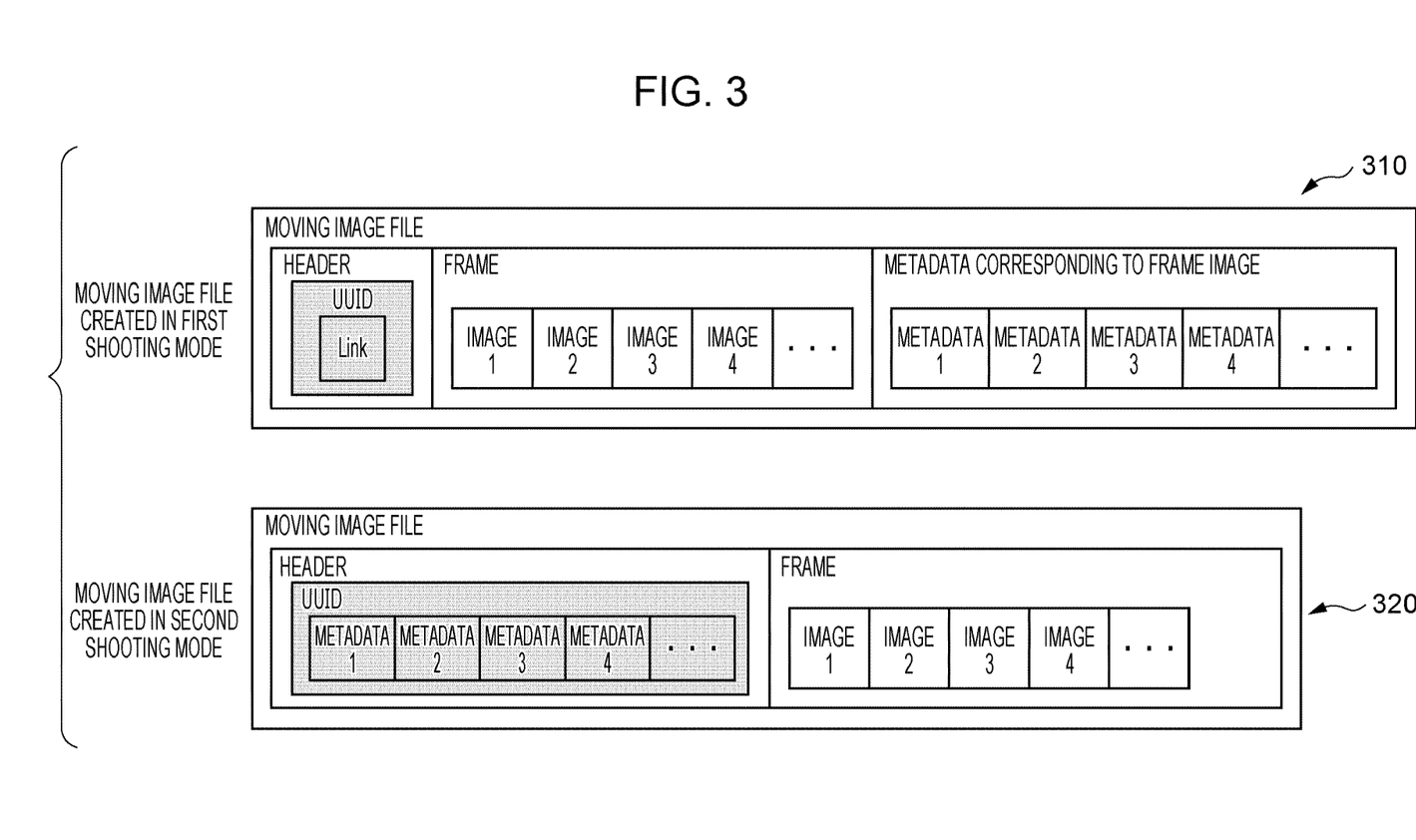
FIG. 3 illustrates image files created in a first embodiment.

A recording operation in a first embodiment and image files to be created will now be described with reference to FIG. 2 and FIG. 3. FIG. 2 is a flowchart illustrating the recording operation in the first embodiment. The recording operation is realized by the microcomputer 108, which controls the components and performs the arithmetic processing based on programs read out from the ROM 109. FIG. 3 illustrates the image files that are created and are recorded on the recording medium 112 in the first embodiment.

First, the moving image files that are created and recorded through the video shooting in the first embodiment will be described with reference to FIG. 3.

The imaging apparatus 100 of the first embodiment has a first shooting mode (a first recording mode) and a second shooting mode (a second recording mode) as the shooting modes (recording modes) and is capable of switching the shooting mode setting in response to a setting by the user. Here, in the first shooting mode (the first recording mode), the moving image data that has been acquired since the start-of-video-recording instruction is received until the end-of-video-recording instruction is received is recorded as one moving image file. In contrast, in the second shooting mode (the second recording mode), the video corresponding to a predetermined time (four seconds in the first embodiment)

since the start-of-video-shooting instruction is received is shot and the moving image data corresponding to four seconds is recorded in the moving image file. In addition, in the first embodiment, in the second shooting mode, the moving image data corresponding to the predetermined time is additionally recorded in a moving image file for the second shooting mode. Accordingly, multiple pieces of the moving image data corresponding to four seconds, which are shot in response to multiple start-of-video-shooting instructions, are recorded in one moving image file. Consequently, in playback, only playing back one moving image file enables the multiple pieces of the moving image data corresponding to four seconds to be continuously played back. Chapter information is added to each piece of the moving image data corresponding to four seconds and the multiple pieces of the moving image data corresponding to four seconds are recorded as the pieces of the moving image data having different chapters.

In the first shooting mode, recording metadata for each frame of the moving image data that is shot increases the size of the entire metadata. In addition, in the first shooting mode, shooting parameters concerning the processing performed by the camera signal processing unit 103 in the shooting, scene information detected in the shooting, face detection information, luminance information, and so on are recorded as the metadata for each frame image of the moving image data. In addition, an inclination angle or inclination information indicating the horizontal and vertical rotation state about the imaging apparatus 100, which is detected by the sensor 122 in the shooting of the frame, is also recorded. As described above, the information useful for search for a desired scene or frame by the user in the playback is recorded in the first shooting mode. Since the metadata having a large amount of data is recorded in the first shooting mode, the metadata is desirably recorded at the end of the moving image file.

Accordingly, in a moving image file 310 that is generated and recorded in the first shooting mode, a header area, an image area where the moving image data (each frame image of the moving image) is stored, and a metadata area where multiple pieces of metadata corresponding to the respective frame images are stored are sequentially arranged, as illustrated in FIG. 3. As illustrated in the moving image file 310, the metadata area where the metadata is stored is arranged after the image area and at the end of the file.

In the second shooting mode, the size of the metadata is not increased to an extent in the first shooting mode and the metadata has a small size. In the second shooting mode, the inclination angle or the inclination information indicating the horizontal and vertical rotation state, which is detected by the sensor 122 in the shooting of the frame image, is recorded in the moving image file as the metadata. In the playback of the moving image file created in the second shooting mode, the playback is performed while the cut is varied every four seconds. At this time, if the imaging apparatus 100 is vertically oriented or horizontally oriented at a cut line during the shooting, the horizontal and vertical sizes of the video are varied each time the cut is varied in the playback, thus causing unnatural playback. Accordingly, the inclination information (the horizontal and vertical data) detected by the sensor 122 is additionally recorded also in the metadata each time the video recording corresponding to four seconds is repeatedly performed. Reading out the metadata in the playback and playing back, for example, only the cut that is vertically shot enable natural playback. In the second shooting mode, the metadata is recorded every predetermined number of seconds (for example, every second) or every predetermined number of frames (for example, every 15 frames) without recording of the metadata for each frame. The number of kinds of information to be recorded as the metadata is smaller than that in the first shooting mode and the amount of information in one piece of metadata is smaller than that in the first shooting mode. Accordingly, the size of the metadata is not increased and the metadata is desirably recorded in the header of the moving image file. In the first embodiment, although the metadata is recorded every predetermined number of seconds (for example, every second) or every predetermined number of frames (for example, every 15 frames) in the second shooting mode, the metadata may be recorded for each frame (for all the frames). Since the amount of information per one piece of metadata is small even when the metadata is recorded for each frame, the size of the metadata is not increased so much.

Accordingly, in a moving image file 320 that is generated and recorded in the second shooting mode, the header area and the image area where the moving image data (each frame image of the moving image) is stored are sequentially arranged, as illustrated in FIG. 3, and the metadata is recorded in the header area. If the metadata is recorded at the end of the file, as in the moving image file 310 generated in the first shooting mode, when the moving image data is repeatedly additionally recorded in the second shooting mode, it takes a lot of trouble to separate the metadata at the end of the file as another file to perform the additional recording of the frame image and to combine the metadata at the end of the file into one file again. Accordingly, recording the metadata in the header area, as in the moving image file 320, in the second shooting mode eliminates the trouble. Since the metadata is subsequently additionally recorded in the header area, a blank area to which the metadata is capable of being additionally recorded and which has a certain size is ensured to create the header area when the moving image file where the moving image is recorded is newly created in the second shooting mode. Since the metadata is capable of being read out by reading out the header in the playback, it is not necessary to additionally seek the moving image file in order to read out the metadata.

The flowchart of the recording operation will be described with reference to FIG. 2. FIG. 2 is a flowchart illustrating the process of the recording operation when the moving image data is recorded as the moving image file in response to an operation with the video shooting button.

Referring to FIG. 2, in Step S201, the microcomputer 108 determines whether the start-of-video-recording instruction is received in response to an operation with the video shooting button of the operation unit 107 by the user. If the start-of-video-recording instruction is received (YES in Step S201), the process goes to Step S202. If the start-of-video-recording instruction is not received (NO in Step S201), the determination in Step S201 is repeated.

In Step S202, the microcomputer 108 determines whether the current shooting mode (the current recording mode) of the imaging apparatus 100 is the first shooting mode (the first recording mode) or the second shooting mode (the second recording mode). If the microcomputer 108 determines that the current shooting mode (the current recording mode) of the imaging apparatus 100 is the first shooting mode (YES in Step S202), the process goes to Step S203. If the microcomputer 108 determines that the current shooting mode (the current recording mode) of the imaging apparatus 100 is the second shooting mode (NO in Step S202), the process goes to Step S204. The shooting mode (the recording mode) of the imaging apparatus 100 is capable of being set by the user who operates the operation unit 107 on a menu screen or who operates a shooting mode dial of the operation unit 107. Since the information about the set shooting mode is stored in the ROM 109, the microcomputer 108 reads out the information about the shooting mode from the ROM 109 to determine the current shooting mode.

In the first shooting mode, in Step S203, the microcomputer 108 newly creates the moving image file where the moving image data is to be recorded on the recording medium 112 with the recording-reproducing unit 104. In the creation of the moving image file, the header area is created and the image area is created after the header area, as in the moving image file 310 in FIG. 3. The moving image data (the data about the frame image) generated through the shooting is recorded in the image area.

In the second shooting mode, in Step S204, the microcomputer 108 determines whether the moving image file for the second shooting mode in which the moving image data is to be additionally recorded in the second shooting mode exists on the recording medium 112. Here, it is determined whether the moving image file to which a specific file name is given is recorded on the recording medium 112. If the microcomputer 108 determines that the moving image file for the additional recording is not recorded on the recording medium 112 (NO in Step S204), the process goes to Step S205. In Step S205, the microcomputer 108 newly creates the moving image file where the moving image data is to be recorded on the recording medium 112 with the recording-reproducing unit 104. The moving image file that is newly created is subsequently used as an additional recording moving image file. Here, as in the moving image file 320 in FIG. 3, the header area is created and the image area is created after the header area. An area larger than the header area that is normally created is ensured for the header area of the moving image file to be newly created. This is because the metadata for the moving image data corresponding to four seconds, which will be shot, is recorded in the header area and the metadata for the moving image data, which will be shot in the second shooting mode, is also additionally recorded in the header area, as described above. Accordingly, in Step S205, the blank area of a certain size is ensured in a universal unique identifier (UUID) tag in the header area as a metadata recording area to create the header area and the subsequent area is used as the image area. If the microcomputer 108 determines that the additional recording moving image file is recorded on the recording medium 112 (YES in Step S204), the creation of the moving image file on the recording medium in Step S205 is not performed and the process goes to Step S206.

In Step S206, the microcomputer 108 outputs the image signal from the imaging device 102, performs the resizing with the resizing unit 116 and performs the compression with the compression-decompression unit 121 to generate the frame image for the moving image data, and records the frame image in the image area of the moving image file. The frame image is recorded in the image area of the moving image file created in Step S203 in the first shooting mode, and the frame image is recorded in the image area of the additional recording moving image file in the second shooting mode. The generation and recording of the frame image are performed at a frame rate, which is set in advance as a shooting setting.

In Step S208, the microcomputer 108 generates the metadata corresponding to the frame image generated in Step S206 and accumulates the metadata in the DRAM 111. In the generation of the frame image in Step S206, the microcomputer 108 generates the metadata corresponding to the frame image. The inclination information about the inclination (the horizontal and vertical state) of the imaging apparatus 100, which is acquired from the sensor 122 at the timing when the image signal is output from the imaging device 102, the shooting parameters used by the camera signal processing unit 103 for certain processing, information about the face detection result, information about an in-focus area in the shooting, and so on are capable of being generated as the metadata. As described above, in the first shooting mode, the inclination information, the shooting parameters, the shooting setting information, the face detection information (face information), the in-focus information, and the luminance information about the image are accumulated in the DRAM 111 (buffer) as the metadata for each frame. In the second shooting mode, the inclination information and the face detection information are accumulated in the DRAM 111 as the metadata every predetermined number of seconds or every predetermined number of frames.

In Step S209, the microcomputer 108 determines whether it is a timing to end the recording of the moving image. In the first shooting mode, the microcomputer 108 determines that it is a timing to end the recording if the end-of-video-recording instruction is issued in response to an operation by the user with the video shooting button of the operation unit 107. In the second shooting mode, the microcomputer 108 determines that it is a timing to end the recording if four seconds elapsed since the start-of-video-recording instruction is issued in Step S201 and the moving image data corresponding to four seconds are acquired. If the microcomputer 108 determines that it is a timing to end the recording (YES in Step S209), the process goes to Step S210. If the microcomputer 108 determines that it is not a timing to end the recording (NO in Step S209), Steps S206 and S208 are repeated until it is determined that it is a timing to end the recording. In Step S210, the microcomputer 108 determines whether the shooting mode of the imaging apparatus 100 is the first shooting mode or the second shooting mode, as in Step S202. If the microcomputer 108 determines that the shooting mode is the first shooting mode (YES in Step S210), the process goes to Step S211. If the microcomputer 108 determines that the shooting mode is the second shooting mode (NO in Step S210), the process goes to Step S212. When the shooting mode of the imaging apparatus 100 is the first shooting mode, in Step S211, the microcomputer 108 records the metadata accumulated in the DRAM 111 with the recording-reproducing unit 104 in Step S208 in the moving image file on the recording medium 112. At this time, as in the moving image file 310 in FIG. 3, the metadata accumulated in the DRAM 111 is written to the area at the end of the moving image file after the image area. Then, the microcomputer 108 records an offset value to the beginning of the metadata recording area in which the metadata is recorded or an initial address of the metadata recording area in the UUID tag of the header area. When the shooting mode of the imaging apparatus 100 is the second shooting mode, in Step S212, the microcomputer 108 records the metadata accumulated in the DRAM 111 with the recording-reproducing unit 104 in Step S208 in the UUID tag of the header area of the moving image file on the recording medium 112. Since the area to which the metadata is capable of being additionally recorded is ensured in advance in the UUID tag of the moving image file where the metadata is recorded in the second shooting mode, the metadata accumulated in the DRAM 111 is additionally recorded in the blank area of the UUID tag. In Step S215, the microcomputer 108 performs a closing process of the moving image file to be recorded to complete the moving image file and terminates the recording process of the moving image file.

As described above, the metadata is recorded at the end of the moving image file in the first shooting mode while the metadata is recorded in the header of the moving image file in the second shooting mode. Accordingly, in the first shooting mode, since the size of the header is not increased, it is possible to reduce the possibility that the metadata is not capable of being read out in a playback device because the header is too large. In contrast, in the second shooting mode, the metadata is included in the header and it is easy to process the metadata in the additional recording process and the playback process.

In the first embodiment, in the second shooting mode, the moving image corresponding to four seconds since the shooting instruction is received from the operation unit 107 is captured and recorded. However, the moving image data corresponding to the last four seconds and the metadata may be held in the DRAM 111 before the shooting instruction is received from the operation unit 107 and the moving image data corresponding to four seconds and the metadata may be recorded in the additional recording moving image file in response to the shooting instruction.

Second Embodiment

A second embodiment will now be described. The basic configuration of the second embodiment is the same as that of the first embodiment. In the second embodiment, a third shooting mode is provided, in addition to the first shooting mode and the second shooting mode. In the third shooting mode, the recording position of the metadata in the image file is differentiated from those in the first shooting mode and the second shooting mode.

Figure 4:
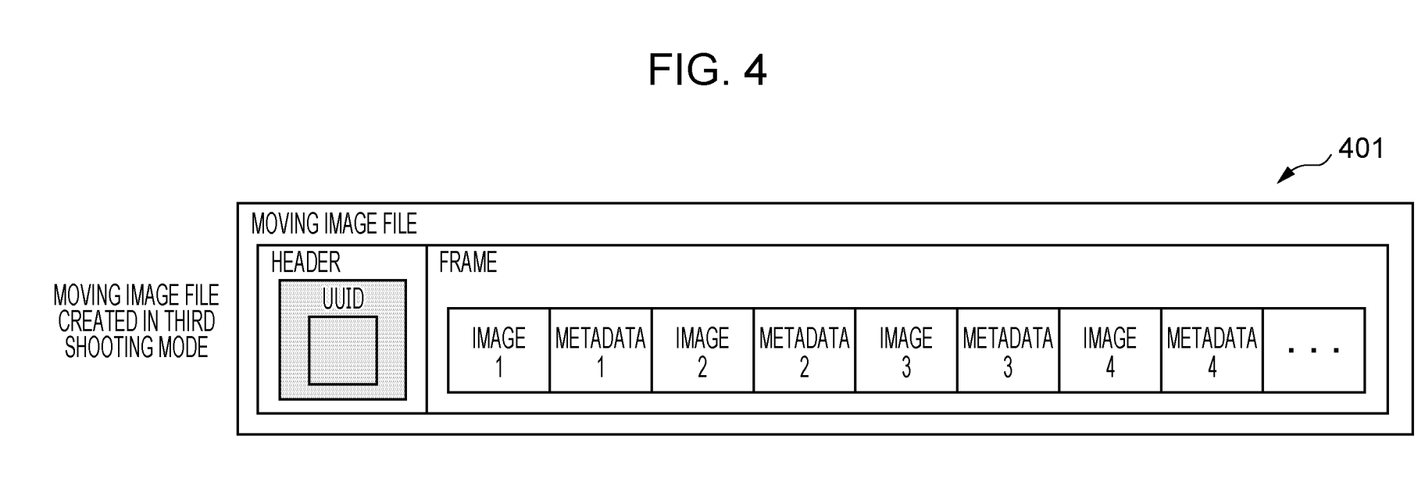
FIG. 4 illustrates an image file created in a second embodiment.

The image file to be recorded in the second embodiment will be described with reference to FIG. 4. FIG. 4 illustrates the moving image file created in the second embodiment. When the imaging apparatus 100 is in the third shooting mode, the microcomputer 108 creates the moving image file, such as a moving image file 401 in FIG. 4. Sets of the frame image and the metadata corresponding to the frame image are recorded in the moving image file 401. As illustrated in FIG. 4, the metadata is joined behind the data about the frame image to create a frame data set composed of the frame image and the metadata of one frame and the frame data sets of multiple frames are recorded. The offset value to the frame data set of each frame or the initial address of the frame data set of each frame is recorded in the header area of the moving image file. Alternatively, the metadata corresponding to the frame may be recorded before the data about the frame image as a frame image header of the data about the frame image. Since the pieces of metadata are not collectively recorded in the header or the end of the moving image file, unlike the moving image file 310 and the moving image file 320, it is necessary to read out the metadata while seeking through the moving image file 401 when only the metadata is to be read out and, thus, it takes time to read out the metadata. However, when the metadata corresponding to the frame image is to be read out with the frame image, it is possible to easily read out the metadata by seeking to the frame image.

The third shooting mode is desirably set in a case in which the sets of the metadata and the image frame corresponding to the metadata are supposed to be used. A continuous shooting mode is considered as such a case. The continuous shooting is performed in the third shooting mode and the respective frame images resulting from the continuous shooting are stored as one moving image file. When the continuously shoot images are played back or processed, it is desirable to individually process the image frames. When the moving image file 310 is recorded in the first shooting mode, since it is necessary to read out the frame image and to perform the seek to the end of the file to read out the metadata. In contrast, when the moving image file 401 is recorded, the pieces of metadata are capable of being read out concurrently with the reading out of the image frames. As described above, the sets of the metadata and the image frame corresponding to the metadata are easily used in the third shooting mode.

As described above, the recording position of the metadata is desirably switched depending on the continuous shooting mode (the recording mode) not only in the simple video shooting but also in the recording of the piece of metadata corresponding to the frame images of the continuously shoot images through the continuous shooting as the image file. In other words, the present disclosure is applicable to a case in which multiple continuous images shot through the continuous shooting, as in the continuous shooting of the moving image and the still image, and the pieces of metadata are recorded as the image file. The image files to be recorded in the respective shooting modes may be recorded in the files of the same recording formant regardless of the shooting mode or may be recorded in the files of different recording formats in accordance with the recording formats of the metadata in the respective shooting modes.

Other Embodiments

While the present disclosure is described in terms of some specific examples and embodiments, it will be clear that the present disclosure is not limited to these specific examples and embodiments and that many changes and modifications may be made without departing from the true spirit and scope of the present disclosure. Part of the above embodiments may be appropriately combined. The imaging apparatus is exemplified in the above embodiments. However, the present disclosure is realized as another apparatus, for example, a mobile terminal such as a smartphone or a personal computer (PC) with a camera as long as the apparatus is a recording apparatus that records the continuous images that are shoot (the continuously shoot moving images or still images) as the image file. The present disclosure may be realized as an image recording system in which the imaging apparatus is connected to the recording apparatus. Alternatively, the present disclosure may be realized by adopting the above recording control method when the recording apparatus connected to the imaging apparatus acquires the continuous images and the metadata from the imaging apparatus and records the acquired continuous images and the metadata as the image file.

Embodiments of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the scope of the present disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-068850, filed on Mar. 29, 2019, which is hereby incorporated by reference herein in its entirety.

What is claimed is:

1. An imaging apparatus comprising:
   an image capturing device configured to continuously capture an optical image to generate continuous images; and
   a memory and at least one processor which function as:
   a metadata generating unit configured to generate a plurality of pieces of metadata corresponding to the respective continuous images;
   a shooting mode setting unit; and
   a control unit configured to control the continuous images and the plurality of pieces of metadata so as to be recorded as one image file,
   wherein the control unit switches recording positions of the plurality of pieces of metadata generated by the metadata generating unit in the image file in accordance with a shooting mode set by the shooting mode setting unit, and
   wherein the control unit controls the plurality of pieces of metadata so as to be stored in an area at an end of the image file when a first shooting mode is set and controls the plurality of pieces of metadata so as to be stored in a header area of the image file when a second shooting mode is set.

2. The imaging apparatus according to claim 1,
   wherein a moving image captured by the image capturing unit from a start-of-recording instruction to an end-of-recording instruction, which are input by a user, is recorded as the image file in the first shooting mode, and
   wherein a moving image corresponding to a predetermined time captured by the image capturing unit is recorded in the image file in the second shooting mode.

3. The imaging apparatus according to claim 2,
   wherein, in the second shooting mode, the moving image corresponding to the predetermined time is additionally recorded in the image file in response to a recording instruction to record a plurality of moving images each corresponding to the predetermined time, which corresponds to a plurality of recording instructions, in one image file.

4. The imaging apparatus according to claim 3,
   wherein, when the moving images and a plurality of pieces of metadata corresponding to a plurality of frames of the moving images are recorded on a recording medium as the image file in the first shooting mode, the control unit controls the plurality of pieces of metadata so as to be recoded in an area after the area where the moving images are recorded after completion of the recording of the moving images, and
   wherein, when the moving images corresponding to the predetermined time and the plurality of pieces of metadata corresponding to the plurality of frames of the moving images are recorded on the recording medium as the image file in the second shooting mode, the control unit creates an image file having a header area including a metadata area having a predetermined size where the plurality of pieces of metadata are to be stored and controls the plurality of pieces of metadata so as to be recorded in the metadata area if the image file in which the moving images are to be additionally recorded does not exist on the recording medium and controls the plurality of pieces of metadata so as to be additionally recorded in the metadata area of the image file if the image file in which the moving images are to be additionally recorded exists on the recording medium.

5. The imaging apparatus according to claim 1,
   wherein the control unit controls a plurality of data sets corresponding to a plurality of images so as to be recorded in the image file, one data set being composed of an image and metadata corresponding to the optical image, when a third shooting mode is set.

6. The imaging apparatus according to claim 5,
   wherein the third shooting mode is a still image continuous shooting mode, and
   wherein the control unit controls continuously shoot images captured in the third shooting mode so as to be recorded in one image file.

7. The imaging apparatus according to claim 1,
   wherein the control unit controls the metadata generated for each of the continuous images generated by the metadata generating unit so as to be recorded in the image file in the first shooting mode and controls the plurality of pieces of metadata generated for every predetermined number of images, which are generated by the metadata generating unit, so as to be recorded in the image file in the second shooting mode.

8. The imaging apparatus according to claim 1,
   wherein the metadata includes at least one of face information about a face included in the optical image, capturing parameter information in the capturing of the optical image, and inclination information about inclination of the imaging apparatus in the capturing of the optical image.

9. The imaging apparatus according to claim 1,
   wherein the control unit controls a kind of the pieces of metadata to be recorded in the image file in the first shooting mode so as to be differentiated from a kind of the pieces of metadata to be recorded in the image file in the second shooting mode.

10. A recording control method comprising:
    acquiring continuous images that are continuously captured;
    acquiring a plurality of pieces of metadata corresponding to the respective continuous images; and controlling the continuous images and the plurality of pieces of metadata so as to be recorded as one image file, wherein the controlling switches recording positions of the plurality of pieces of metadata that are acquired in the image file in accordance with a recording mode of the continuous images, and wherein the controlling controls the plurality of pieces of metadata so as to be stored in an area at an end of the image file when a first shooting mode is set and controls the plurality of pieces of metadata so as to be stored in a header area of the image file when a second shooting mode is set.

11. The recording control method according to claim 10, wherein, in the first recording mode, a moving image that is captured from a start-of-recording instruction to an end-of-recording instruction, which are input by a user, is recorded as the image file, and wherein, in the second recording mode, a moving image corresponding to a predetermined time is additionally recorded in the image file in response to a recording instruction to record a plurality of moving images each corresponding to the predetermined time, which corresponds to a plurality of recording instructions, in one image file.

12. The recording control method according to claim 10, wherein the controlling controls a plurality of data sets corresponding to a plurality of images so as to be recorded in the image file, one data set being composed of an image and metadata corresponding to the optical image, when a third recording mode is set.

13. The recording control method according to claim 12, wherein the third recording mode is a still image continuous shooting mode.

14. A non-transitory computer-readable storage medium storing the program of instructions executable by a computer to perform the recording control method according to claim 10.

15. An image processing apparatus comprising:

at least one memory storing at least one program of instructions; and at least one processor coupled to the at least one memory and configured to execute the at least one program of instructions to perform a recording control method, the recording control method comprising:

acquiring continuous images that are continuously captured;

acquiring a plurality of pieces of metadata corresponding to the respective continuous images; and controlling the continuous images and the plurality of pieces of metadata so as to be recorded as one image file, wherein the controlling switches recording positions of the plurality of pieces of metadata that are acquired in the image file in accordance with a recording mode of the continuous images, and wherein the controlling controls the plurality of pieces of metadata so as to be stored in an area at an end of the image file when a first shooting mode is set and controls the plurality of pieces of metadata so as to be stored in a header area of the image file when a second shooting mode is set.

* * * * *